US012489210B2

(12) United States Patent
Chang

(10) Patent No.: US 12,489,210 B2
(45) Date of Patent: Dec. 2, 2025

(54) MULTI-FEED ANTENNA WITH A SHARED RADIATOR

(71) Applicant: NANJING SILERGY MICRO (HK) CO., LIMITED, Causeway Bay (HK)

(72) Inventor: Chia-Lin Chang, Taipei (TW)

(73) Assignee: Nanjing Silergy Micro (HK) Co., Ltd., Nanjing (CN)

( * ) Notice: Subject to any disclaimer, the term of this patent is extended or adjusted under 35 U.S.C. 154(b) by 168 days.

(21) Appl. No.: 17/876,619

(22) Filed: Jul. 29, 2022

(65) Prior Publication Data

US 2023/0052735 A1 Feb. 16, 2023

(30) Foreign Application Priority Data

Aug. 10, 2021 (CN) ......................... 202110911864.9

(51) Int. Cl.
*H01Q 5/378* (2015.01)
*H01Q 9/04* (2006.01)
*H01Q 9/30* (2006.01)

(52) U.S. Cl.
CPC ............. *H01Q 5/378* (2015.01); *H01Q 9/045* (2013.01); *H01Q 9/30* (2013.01)

(58) Field of Classification Search
None
See application file for complete search history.

(56) References Cited

U.S. PATENT DOCUMENTS 12,317,475 B2 5/2025 Sakui et al.
2017/0244818 A1* 8/2017 Kim ....................... H01Q 1/243
2019/0041929 A1* 2/2019 Bologna ................ G05B 15/02
2020/0021029 A1* 1/2020 Chou .................. H01Q 9/0421
2020/0119429 A1* 4/2020 Park ........................ H01Q 5/335
2022/0223998 A1* 7/2022 Jang ........................ H01Q 5/328
2023/0318180 A1* 10/2023 Lan ........................ H01Q 1/243
343/702
2023/0344152 A1* 10/2023 Wu .......................... H01Q 5/35
2023/0352852 A1* 11/2023 Wu ........................ H01Q 1/241
2023/0361467 A1* 11/2023 Wu .......................... H01Q 5/40
2024/0072418 A1* 2/2024 Wu ...................... H04B 1/0064

FOREIGN PATENT DOCUMENTS

CN 104183914 A 12/2014
CN 112490626 A * 3/2021 ............... H01Q 1/22
TW 201818612 A 8/2018
WO WO-2022247378 A1 * 12/2022

* cited by examiner

*Primary Examiner* — Dameon E Levi
*Assistant Examiner* — Anh N Ho

(57) ABSTRACT

A multi-feed antenna with a shared radiator comprises a ground capacitor, a first antenna module, a second antenna module, a first feed-in module, a second feed-in module and at least one sensing module. The first antenna module is grounded through the ground capacitor. The second antenna module is coupled with the first antenna module. The first feed-in module and the second feed-in module are connected with the second antenna module, and the first feed-in module and the second feed-in module are used to receive or send radio frequency signals through the first antenna module and the second antenna module. The at least one sensing module is connected with the first antenna module or the second antenna module, and the at least one sensing module is used to sense a capacitance value of a parasitic capacitance of the first antenna module or the second antenna module.

14 Claims, 7 Drawing Sheets

MULTI-FEED ANTENNA WITH A SHARED RADIATOR

RELATED APPLICATIONS

The present application claims the priority of Chinese Application No. 202110911864.9, filed on Aug. 10, 2021, the disclosure of which is hereby incorporated by reference herein in its entirety.

BACKGROUND OF THE INVENTION

1. Field of the Invention

The present invention generally relates to a multi-feed antenna with a shared radiator, and, more particularly, to a multi-feed antenna with a shared radiator capable of receiving and sending radio frequency signals and sensing distance.

2. Description of the Related Art

In general, when a mobile device, such as cell phones, or a wearable device, such as earphones, needs to sense whether a human body contacts the device or a distance between the human body and the device, the sensing ability will be achieved by a sensing radiator and a sensing module coupled with the sensing radiator. More specifically, the sensing module determines the distance by sensing a change of the capacitance value of the sensing radiator. On the other hand, the mobile device or the wearable device also needs an antenna radiator to receive or send radio frequency signals for communication in order to achieve the wireless communication.

However, the sensing signals for sensing the human body and the radio frequency signals for communication will interfere with each other. The problem can be solved by adding an isolation element or increasing the distance between the antenna radiator and the sensing radiator in the prior art. Either way goes against the miniaturization of the mobile device or the wearable device and may increase costs. Therefore, how to provide a multi-feed antenna with a shared radiator capable of receiving and sending the radio frequency signals and sensing the distance has become an urgent problem to be solved in the industry.

SUMMARY OF THE INVENTION

In light of solving the foregoing problems of the prior art, the present invention provides a multi-feed antenna with a shared radiator that can receive and send the radio frequency signals and sense the distance.

In order to solve the aforementioned problems, the multi-feed antenna with a shared radiator of the present invention comprises a ground capacitor, a first antenna module, a second antenna module, a first feed-in module, a second feed-in module and at least one sensing module.

The first antenna module is grounded through the ground capacitor. The second antenna module is coupled with the first antenna module. The first feed-in module is connected with the second antenna module, and the first feed-in module is used to receive or send radio frequency signals through the first antenna module and the second antenna module. The second feed-in module is connected with the second antenna module, and the second feed-in module is used to receive or send radio frequency signals through the first antenna module and the second antenna module. The at least one sensing module is connected with the first antenna module or the second antenna module, and the at least one sensing module is used to sense a capacitance value of a parasitic capacitance of the first antenna module or the second antenna module.

In an embodiment, the first antenna module and the second antenna module are coupled with each other through a distributed capacitor structure or a lumped capacitor structure.

In an embodiment, the first feed-in module further comprises a first matching circuit and a first capacitor, and the first matching circuit and the first capacitor are connected with each other. The second feed-in module further comprises a second matching circuit and a second capacitor, and the second matching circuit and the second capacitor are connected with each other.

In an embodiment, the multi-feed antenna with a shared radiator further comprises at least one first inductor, and the at least one sensing module is connected with the first antenna module or the second antenna module through the first inductor.

In an embodiment, the at least one sensing module is self-capacitive sensing module, wherein, if the multi-feed antenna with a shared radiator comprises a first self-capacitive sensing module and a second self-capacitive sensing module, the first self-capacitive sensing module is connected with the first antenna module and the second self-capacitive sensing module is connected with the second antenna module.

In an embodiment, the at least one sensing module is mutual-capacitive sensing module, wherein, the multi-feed antenna with a shared radiator comprises a first mutual-capacitive sensing module and a second mutual-capacitive sensing module, and the first mutual-capacitive sensing module is connected with the first antenna module and the second mutual-capacitive sensing module is connected with the second antenna module.

In an embodiment, the first antenna module and the second antenna module have a rectangular shape.

In an embodiment, a total length of the first antenna module and the second antenna module is equivalent to one-eighth to one wavelength of the radio frequency signals.

In an embodiment, the first feed-in module and the second antenna module are connected at a first feed-in point, and the second feed-in module and the second antenna module are connected at a second feed-in point, wherein the first feed-in point is adjacent to the second feed-in point, so that the radio frequency signals received or sent by the first feed-in module and the radio frequency signals received or sent by the second feed-in module belong to the same range of frequency band.

In an embodiment, a distance between the first feed-in point and the second feed-in point is between 0.01 to 0.25 wavelength of the radio frequency signals.

In an embodiment, the multi-feed antenna with a shared radiator further comprises one sensing module, and the sensing module is connected with the second antenna module at the center position between the first feed-in point and the second feed-in point.

The present invention further provides a multi-feed antenna with a shared radiator. The multi-feed antenna with a shared radiator comprises a ground capacitor, a plurality of antenna modules, a plurality of feed-in modules and at least one sensing module.

The plurality of antenna modules are coupled with each other, and one of the antenna modules is grounded through the ground capacitor. The plurality of feed-in modules are connected with the antenna modules, and the feed-in modules are used to receive or send radio frequency signals through the antenna modules. The at least one sensing module is connected with the antenna modules, and the at least one sensing module is used to sense a capacitance value of a parasitic capacitance of the antenna modules.

In an embodiment, the plurality of antenna modules are coupled with each other through a distributed capacitor structure or a lumped capacitor structure.

In an embodiment, each of the feed-in modules further comprises a third matching circuit and a third capacitor, and the third matching circuit and the third capacitor are connected with each other.

In an embodiment, the multi-feed antenna with a shared radiator further comprises a second inductor, and the at least one sensing module is connected with the antenna modules through the second inductor.

In an embodiment, the at least one sensing module is self-capacitive sensing module, wherein, if the multi-feed antenna with a shared radiator comprises the plurality of self-capacitive sensing modules, the self-capacitive sensing modules are connected with different antenna modules respectively.

In an embodiment, the at least one sensing module is mutual-capacitive sensing module, wherein, the multi-feed antenna with a shared radiator comprises the plurality of mutual-capacitive sensing modules, and the mutual-capacitive sensing modules are connected with different antenna modules respectively.

In an embodiment, the antenna modules have a rectangular shape.

In an embodiment, a total length of the plurality of antenna modules is equivalent to one-eighth to one wavelength of the radio frequency signals.

Compared to the prior art, the multi-feed antenna with a shared radiator of the present invention comprises a plurality of feed-in modules, a plurality of antenna modules and at least one sensing module, wherein the feed-in modules and the at least one sensing module share the antenna modules so that the space and cost of the radiator structure can be saved. Besides, the plurality of antenna modules are coupled with each other but not connected directly, so that the low frequency signals can be isolated effectively and the high frequency signals of the feed-in modules and the low frequency signals of the at least one sensing module would not interfere with each other. The multi-feed antenna with a shared radiator according to the present invention is able to receive and send radio frequency signals and sense the distance at the same time. Besides, by arranging the plurality of feed-in modules at different positions of the antenna modules, the antennas of the present invention can be resonated at different frequency to achieve the equivalent effect of multiple antennas.

DETAILED DESCRIPTION

The present invention is described by the following specific embodiments. Those with ordinary skills in the arts can readily understand other advantages and functions of the present invention after reading the disclosure of this specification. Any changes or adjustments made to their relative relationships, without modifying the substantial technical contents, are also to be construed as within the range implementable by the present invention.

Figure 1:
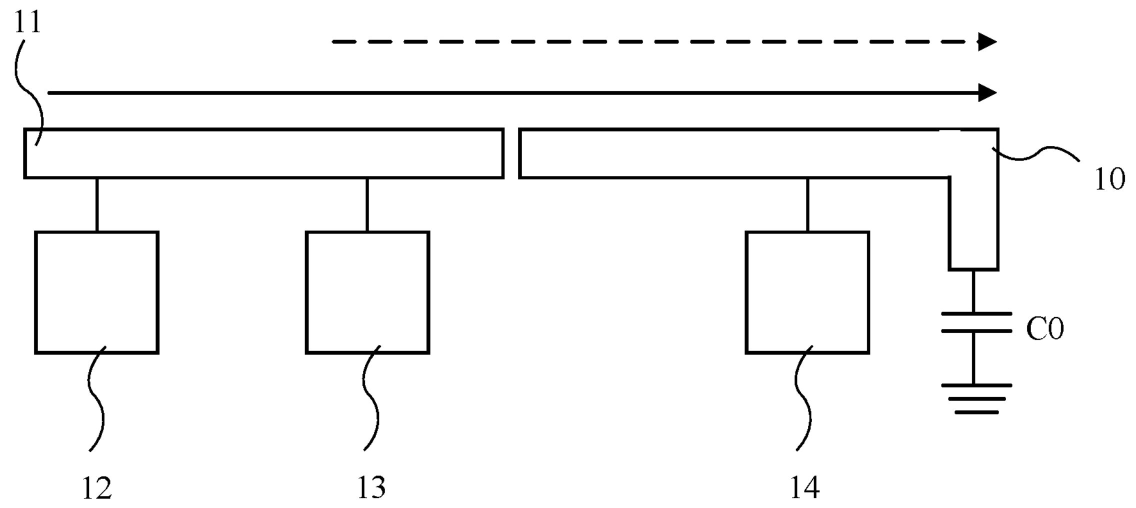
FIG. 1 illustrates a schematic view of a structure of the multi-feed antenna with a shared radiator according to a first embodiment of the present invention.

Please refer to FIG. 1. FIG. 1 illustrates a schematic view of a structure of the multi-feed antenna with a shared radiator according to a first embodiment of the present invention. The multi-feed antenna with a shared radiator of the present invention comprises a ground capacitor C0, a first antenna module 10, a second antenna module 11, a first feed-in module 12, a second feed-in module 13 and at least one sensing module 14.

The first antenna module 10 is grounded through the ground capacitor C0. The second antenna module 11 is coupled with the first antenna module 10. The first feed-in module 12 is connected with the second antenna module 11, and the first feed-in module 12 is used to receive or send radio frequency signals via the first antenna module 10 and the second antenna module 11. The second feed-in module 13 is connected with the second antenna module 11, and the second feed-in module 13 is used to receive or send radio frequency signals via the first antenna module 10 and the second antenna module 11. The at least one sensing module 14 is connected with the first antenna module 10 or the second antenna module 11, and the at least one sensing module 14 is used to sense a capacitance value of a parasitic capacitance of the first antenna module 10 or the second antenna module 11.

In more detail, the first feed-in module 12 and the second feed-in module 13 are connected with the second antenna module 11 but they are arranged or disposed at different feed-in positions. The arrow with a solid line shown in the FIG. 1 indicates a current on the first antenna module 10 and the second antenna module 11 generated by the radio frequency signals sent by the first feed-in module 12, and the arrow with a dashed line indicates a current on the first antenna module 10 and the second antenna module 11 generated by the radio frequency signals sent by the second feed-in module 13. Therefore, the antennas may be resonated by the radio frequency signals sent by the first feed-in module 12 and the second feed-in module 13 at different frequency to achieve the equivalent effect of multiple antennas. In general, the radio frequency signals received or sent by the first feed-in module 12 and the second feed-in module 13 are high frequency signals.

On the other hand, in the embodiment of FIG. 1, the sensing module 14 is connected with the first antenna module 10 and used to sense a capacitance value of a parasitic capacitance of the first antenna module 10. In other embodiments, the sensing module 14 may be connected with the second antenna module 11 and used to sense a capacitance value of a parasitic capacitance of the second antenna module 11. Alternatively, the multi-feed antenna with a shared radiator of the present invention may have two sensing modules 14 connected with the first antenna module 10 and the second antenna module 11, respectively, but not limited thereto. The first antenna module 10 and the second antenna module 11 are made of metal or other conductive material, so the capacitance value sensed by the sensing module 14 can be used to determine whether an object, such as a human body, approaches the first antenna module 10 or the second antenna module 11. In general, the signals sensed by the sensing module 14 are low frequency signals.

Besides, the first antenna module 10 and the second antenna module 11 are coupled with each other but not connected directly. By doing so, the low frequency signals may be isolated effectively so the high frequency signals of the first feed-in module 12 and the second feed-in module 13 would not interfere with the low frequency signals of the sensing module 14. The multi-feed antenna with a shared radiator according to the present invention is able to receive and send radio frequency signals and sense the distance at the same time so the space and cost of the mobile device or the wearable device can be saved by using the multi-feed antenna with a shared radiator of the present invention.

In an embodiment, the first antenna module 10 and the second antenna module 11 can be coupled with each other through a distributed capacitor structure or a lumped capacitor structure. For example, the distributed capacitor structure may be a capacitor structure formed by disposing two conductors, the first antenna module 10 and the second antenna module 11, close to each other, as shown in the embodiment of FIG. 1, but not limited thereto. The lumped capacitor structure may be an additional capacitor structure added between the first antenna module 10 and the second antenna module 11, such as multi-layer ceramic capacitor (MLCC), but not limited thereto.

Figure 2:
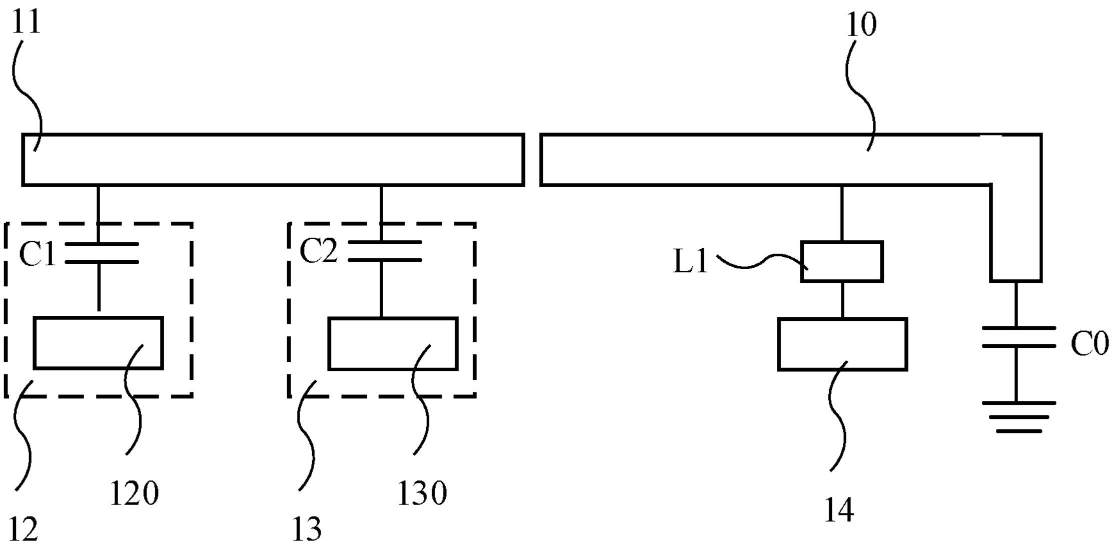
FIG. 2 illustrates a schematic view of a structure of the multi-feed antenna with a shared radiator according to a second embodiment of the present invention.

Please refer to FIG. 2. FIG. 2 illustrates a schematic view of a structure of the multi-feed antenna with a shared radiator according to a second embodiment of the present invention. In an embodiment, the first feed-in module 12 may further comprise a first matching circuit 120 and a first capacitor C1, and the first matching circuit 120 and the first capacitor C1 are connected with each other. The second feed-in module 13 may further comprise a second matching circuit 130 and a second capacitor C2, and the second matching circuit 130 and the second capacitor C2 are connected with each other. The first matching circuit 120, the second matching circuit 130, the first capacitor C1 and the second capacitor C2 can be used to impede matching or isolate the low frequency signals.

In an embodiment, the multi-feed antenna with a shared radiator may further comprise at least one first inductor L1. The at least one sensing module 14 is connected with the first antenna module 10 or the second antenna module 11 via the first inductor L1. The first inductor L1 can be used to separate or isolate the high frequency signals.

Figure 3:
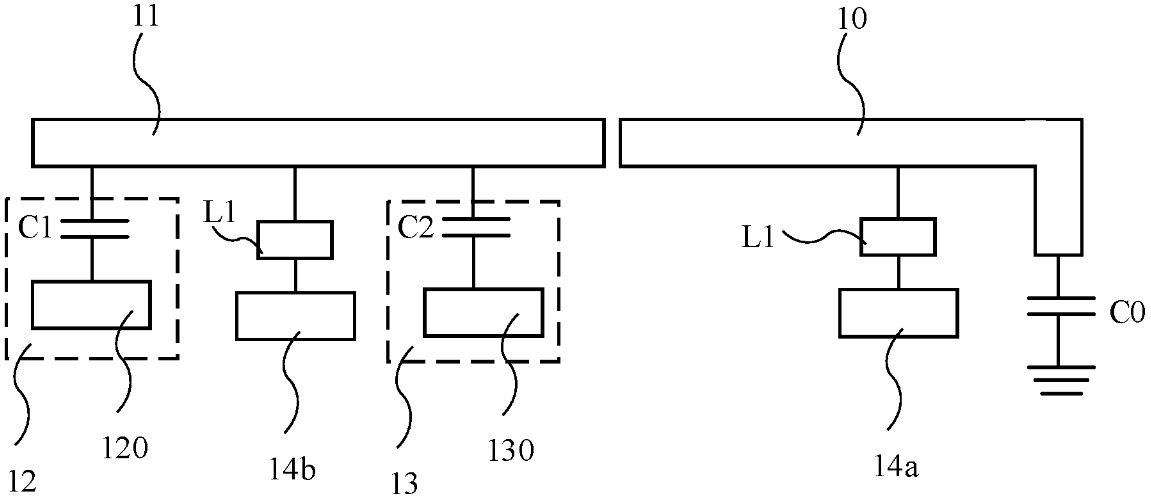
FIG. 3 illustrates a schematic view of a structure of the multi-feed antenna with a shared radiator according to a third embodiment of the present invention.

Please refer to FIG. 3. FIG. 3 illustrates a schematic view of a structure of the multi-feed antenna with a shared radiator according to a third embodiment of the present invention. In an embodiment, the at least one sensing module 14 is self-capacitive sensing module, wherein if the multi-feed antenna with a shared radiator comprises a first self-capacitive sensing module 14*a* and a second self-capacitive sensing module 14*b*, the first self-capacitive sensing module 14*a* is connected with the first antenna module 10 and the second self-capacitive sensing module 14*b* is connected with the second antenna module 11. The first self-capacitive sensing module 14*a* may be used to sense whether an object approaches the first antenna module 10, and the second self-capacitive sensing module 14*b* may be used to sense whether an object approaches the second antenna module 11.

Figure 4:
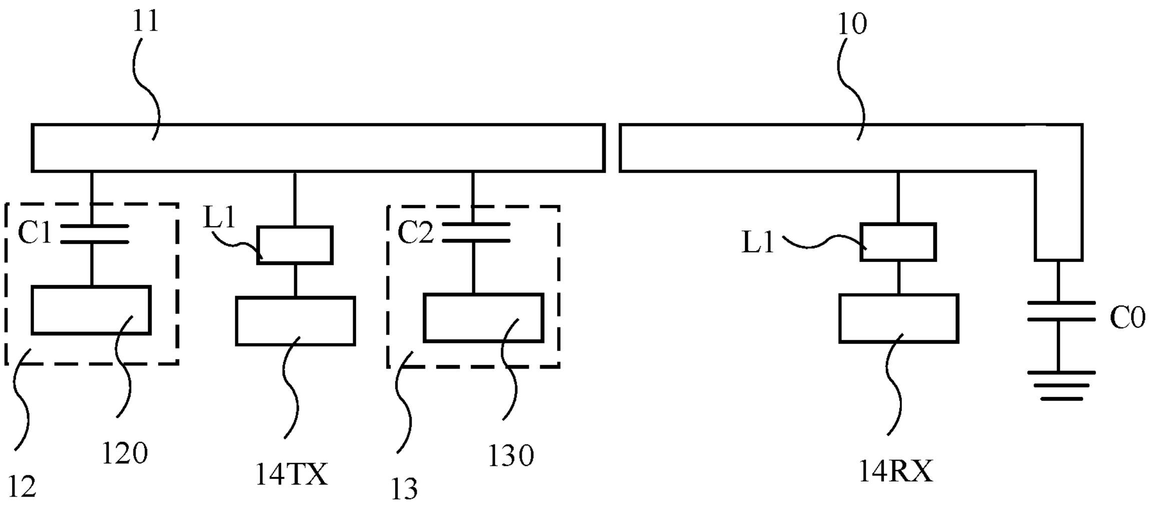
FIG. 4 illustrates a schematic view of a structure of the multi-feed antenna with a shared radiator according to a fourth embodiment of the present invention.

Please refer to FIG. 4. FIG. 4 illustrates a schematic view of a structure of the multi-feed antenna with a shared radiator according to a fourth embodiment of the present invention. In an embodiment, the at least one sensing module 14 is mutual-capacitive sensing module, wherein the multi-feed antenna with a shared radiator comprises a first mutual-capacitive sensing module 14RX and a second mutual-capacitive sensing module 14TX, and the first mutual-capacitive sensing module 14RX is connected with the first antenna module 10 and the second mutual-capacitive sensing module 14TX is connected with the second antenna module 11. The mutual-capacitive sensing module essentially comprises at least one first mutual-capacitive sensing module 14RX and at least one second mutual-capacitive sensing module 14TX. The first mutual-capacitive sensing module 14RX and the second mutual-capacitive sensing module 14TX may be used to sense whether an object approaches between the first antenna module 10 and the second antenna module 11.

Figure 5:
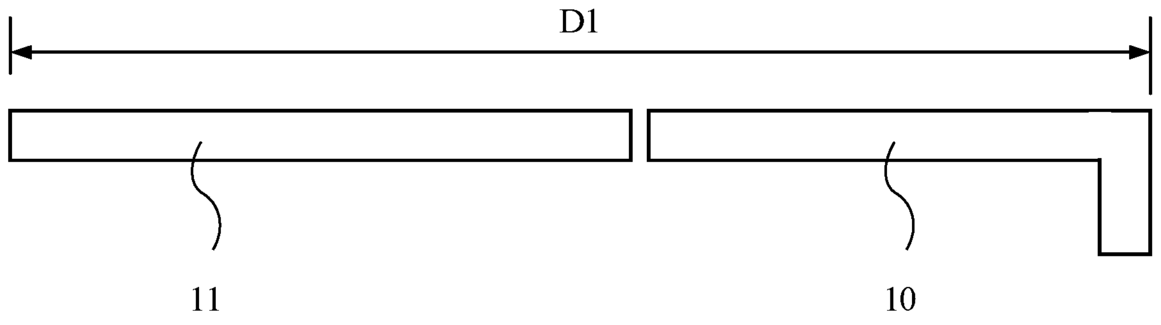
FIG. 5 illustrates a schematic view of a structure of the first antenna module and the second antenna module according to a fifth embodiment of the present invention.

Please refer to FIG. 5. FIG. 5 illustrates a schematic view of a structure of the first antenna module and the second antenna module according to a fifth embodiment of the present invention. In an embodiment, the first antenna module 10 and the second antenna module 11 have a rectangular shape, but not limited thereto.

In an embodiment, a total length D1 of the first antenna module 10 and the second antenna module 11 is equivalent to one-eighth to one wavelength of the radio frequency signals.

Figure 6:
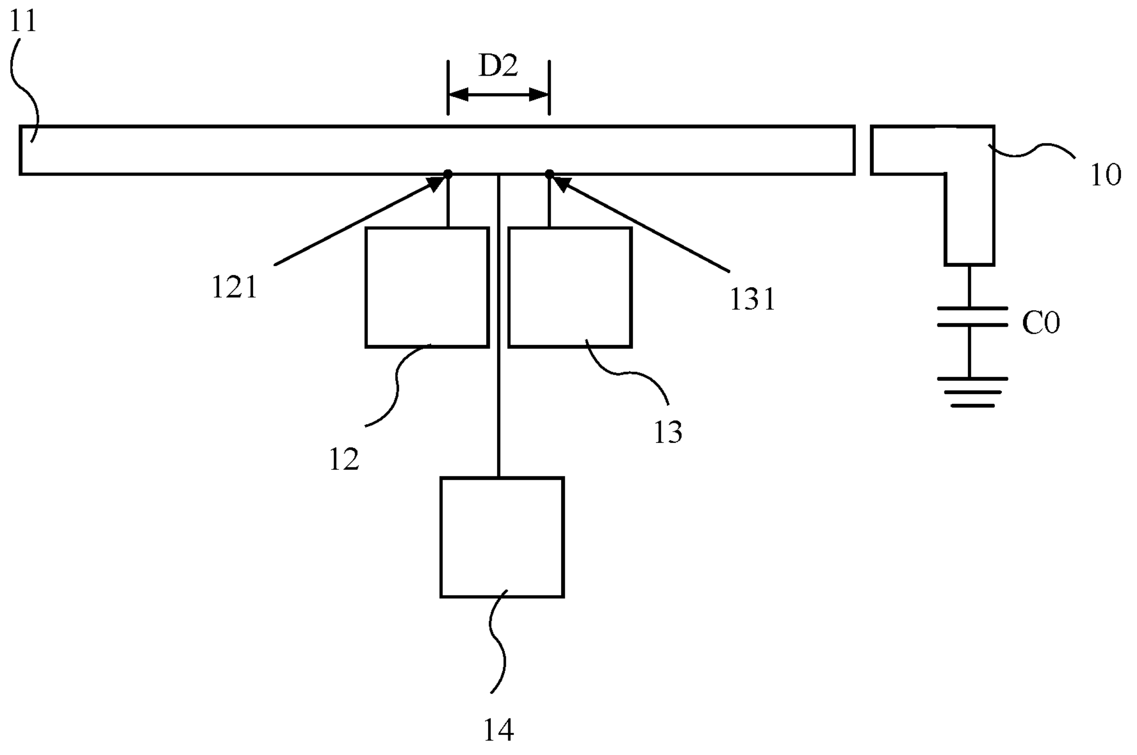
FIG. 6 illustrates a schematic view of a structure of the multi-feed antenna with a shared radiator according to a sixth embodiment of the present invention.

Please refer to FIG. 6. FIG. 6 illustrates a schematic view of a structure of the multi-feed antenna with a shared radiator according to a sixth embodiment of the present invention. In an embodiment, the first feed-in module 12 and the second antenna module 11 are connected at a first feed-in point 121, and the second feed-in module 13 and the second antenna module 11 are connected at a second feed-in point 131, wherein the first feed-in point 121 is close to the second feed-in point 131, so that the radio frequency signals received or sent by the first feed-in module 12 and the second feed-in module 13 are in the same range of frequency band.

In a specific embodiment, a distance D2 between the first feed-in point 121 and the second feed-in point 131 is between 0.01 to 0.25 wavelength of the radio frequency signals. Therefore, the radio frequency signals received or sent by the first feed-in module 12 and the second feed-in module 13 would be in the same range of frequency band.

By arranging or disposing the first feed-in point 121 of the first feed-in module 12 and the second feed-in point 131 of the second feed-in module 13 close to each other and proximity to the center position of the shared radiator, i.e. the first antenna module 10 and the second antenna module 11, the antennas may be resonated by the radio frequency signals sent by the first feed-in module 12 and the second feed-in module 13 in the same range of frequency band. In other words, the first feed-in module 12 and the second feed-in module 13 share the radiator and are symmetric on the shared radiator, so the multi-feed antenna with a shared radiator according to the present invention is able to have two antennas with the same frequency in a smaller area instead of setting two identical antennas as that in the prior art.

In an embodiment, the multi-feed antenna with a shared radiator may further comprise one sensing module 14, and the sensing module 14 is connected with the second antenna module 11 at the center position between the first feed-in point 121 and the second feed-in point 131. The center position is the area with the least current for the antennas resonated by the radio frequency signals sent by the first feed-in module 12 or by the radio frequency signals sent by the second feed-in module 13. As the result, the effect on the function of the antennas would be the least by connecting the sensing module 14 at the center position.

Figure 7:
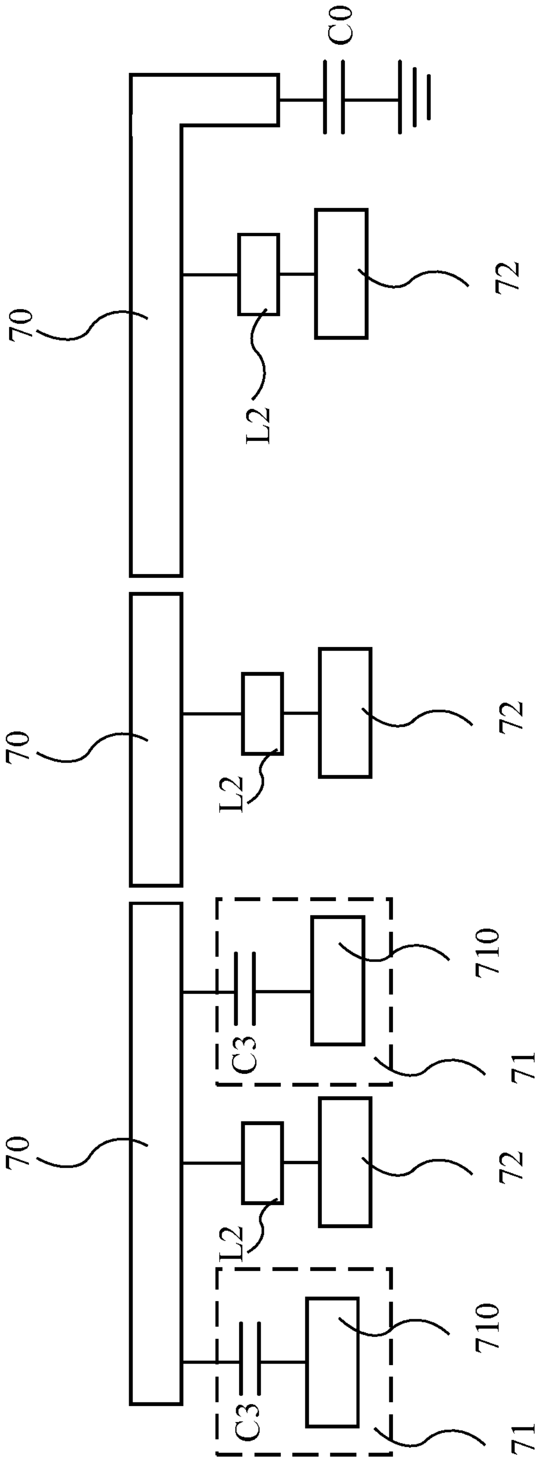
FIG. 7 illustrates a schematic view of a structure of the multi-feed antenna with a shared radiator according to a seventh embodiment of the present invention.

Please refer to FIG. 7. FIG. 7 illustrates a schematic view of a structure of the multi-feed antenna with a shared radiator according to a seventh embodiment of the present invention. The present invention further provides a multi-feed antenna with a shared radiator. The multi-feed antenna with a shared radiator comprises a ground capacitor C0, a plurality of antenna modules 70, a plurality of feed-in modules 71 and at least one sensing module 72.

The plurality of antenna modules 70 are coupled with each other, and one of the antenna modules 70 is grounded via the ground capacitor C0. The plurality of feed-in modules 71 are connected with the antenna modules 70, and the feed-in modules 71 may be used to receive or send radio frequency signals through all the antenna modules 70. The at least one sensing module 72 is connected with the antenna modules 70, and the at least one sensing module 72 is used to sense a capacitance value of a parasitic capacitance of the antenna modules 70.

Take the embodiment of FIG. 7 for example, there are three antenna modules 70, two feed-in modules 71 and three sensing modules 72, but not limited thereto. The multi-feed antenna with a shared radiator of the present invention may have more or fewer antenna modules 70, feed-in modules 71 and sensing modules 72 depending on actual requirements.

In more detail, the feed-in modules 71 are arranged at different feed-in positions, so that the antennas can be resonated by the radio frequency signals sent by each feed-in module 71 at different frequency to achieve the equivalent effect of multiple antennas. Besides, each antenna module 70 is coupled with each other but not connected directly in order to separate or isolate the low frequency signals effectively, so that the high frequency signals of the feed-in modules 71 and the low frequency signals of the sensing modules 72 would not interfere with each other. Therefore, the multi-feed antenna with a shared radiator according to the present invention is able to receive and send radio frequency signals of multiple antennas and sense the distance at the same time, so the space and cost of the mobile device or the wearable device can be saved by using the multi-feed antenna with a shared radiator of the present invention.

In an embodiment, the plurality of antenna modules 70 are coupled with each other via a distributed capacitor structure or a lumped capacitor structure.

In an embodiment, each of the feed-in modules 71 may further comprise a third matching circuit 710 and a third capacitor C3, and the third matching circuit 710 and the third capacitor C3 are connected with each other.

In an embodiment, the multi-feed antenna with a shared radiator may further comprise a second inductor L2, and the at least one sensing module 72 is connected with the antenna modules 70 via the second inductor L2.

In an embodiment, the at least one sensing module 72 is self-capacitive sensing module, wherein, if the multi-feed antenna with a shared radiator comprises the plurality of self-capacitive sensing modules, each of the self-capacitive sensing modules is connected with different antenna modules 70, respectively.

In an embodiment, the at least one sensing module 72 is mutual-capacitive sensing module, wherein the multi-feed antenna with a shared radiator comprises the plurality of mutual-capacitive sensing modules, and each of the mutual-capacitive sensing modules is connected with different antenna modules 70, respectively.

In an embodiment, the antenna modules 70 have a rectangular shape.

In an embodiment, a total length of the plurality of antenna modules 70 is equivalent to one-eighth to one wavelength of the radio frequency signals.

In summary, the multi-feed antenna with a shared radiator of the present invention comprises a plurality of feed-in modules, a plurality of antenna modules and at least one sensing module, wherein the feed-in modules and the at least one sensing module share the antenna modules, so that the space and cost of the radiator structure can be saved. The plurality of antenna modules are coupled with each other but not connected directly to isolate the low frequency signals effectively, so that the high frequency signals of the feed-in modules and the low frequency signals of the at least one sensing module would not interfere with each other. The multi-feed antenna with a shared radiator according to the present invention is able to receive and send radio frequency signals and sense the distance at the same time. Besides, by arranging the plurality of feed-in modules at different positions of the antenna modules, the antenna can be resonated at different frequency to achieve the equivalent effect of multiple antennas.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A multi-feed antenna with a shared radiator, comprising:

a) a ground capacitor;

b) a first antenna module grounded through the ground capacitor;

c) a second antenna module coupled with the first antenna module;

d) a first feed-in module connected with the second antenna module, and the first feed-in module is used to receive or send first radio frequency signals through the first antenna module and the second antenna module;

e) a second feed-in module connected with the second antenna module, and the second feed-in module is used to receive or send second radio frequency signals through the first antenna module and the second antenna module;

f) at least one sensing module, wherein one of the at least one sensing module is connected with the first antenna module, and the one of the at least one sensing module is used to sense a capacitance value of a parasitic capacitance of the first antenna module;

g) wherein the first antenna module is not connected to any of the first and second feed-in modules;

h) wherein the first antenna module and the second antenna module each comprise a rectangular shape, and wherein a total length of the first antenna module and the second antenna module is equivalent to one-eighth to one wavelength of the first or the second radio frequency signals; and i) wherein the first feed-in module and the second antenna module are connected at a first feed-in point, and the second feed-in module and the second antenna module are connected at a second feed-in point, and wherein another sensing module of the at least one sensing module is a self-capacitive sensing module and connected with the second antenna module at a center position between the first feed-in point and the second feed-in point.

2. The multi-feed antenna with the shared radiator of claim 1, wherein the first antenna module and the second antenna module are coupled with each other through a distributed capacitor structure or a lumped capacitor structure.

3. The multi-feed antenna with the shared radiator of claim 1, wherein the first feed-in module further comprises a first matching circuit and a first capacitor, and the first matching circuit and the first capacitor are connected with each other; and the second feed-in module further comprises a second matching circuit and a second capacitor, and the second matching circuit and the second capacitor are connected with each other.

4. The multi-feed antenna with the shared radiator of claim 1, further comprising at least one inductor, and the at least one sensing module is connected with the first antenna module or the second antenna module through the inductor.

5. The multi-feed antenna with the shared radiator of claim 1, wherein the at least one sensing module is self-capacitive sensing module, wherein if the multi-feed antenna with the shared radiator comprises a first self-capacitive sensing module and a second self-capacitive sensing module, the first self-capacitive sensing module is connected with the first antenna module and the second self-capacitive sensing module is connected with the second antenna module.

6. The multi-feed antenna with the shared radiator of claim 1, wherein the at least one sensing module is mutual-capacitive sensing module, wherein the multi-feed antenna with the shared radiator comprises a first mutual-capacitive sensing module and a second mutual-capacitive sensing module, and the first mutual-capacitive sensing module is connected with the first antenna module and the second mutual-capacitive sensing module is connected with the second antenna module.

7. The multi-feed antenna with the shared radiator of claim 1, wherein the first feed-in point is adjacent to the second feed-in point such that the first radio frequency signals and the second radio frequency signals belong to the same range of frequency band.

8. The multi-feed antenna with the shared radiator of claim 7, wherein a distance between the first feed-in point and the second feed-in point is between 0.01 to 0.25 wavelength of the first or the second radio frequency signals.

9. A multi-feed antenna with a shared radiator, comprising:

a) a ground capacitor;

b) a plurality of antenna modules coupled with each other, wherein one of the plurality of antenna modules is grounded through the ground capacitor;

c) a plurality of feed-in modules connected with the plurality of antenna modules, and the plurality of feed-in modules are used to receive or send radio frequency signals through the plurality of antenna modules;

d) at least one sensing module, wherein one of the at least one sensing module is connected with the one of the plurality of antenna modules that is grounded through the ground capacitor, and the one of the at least one sensing module is used to sense a capacitance value of a parasitic capacitance of the plurality of antenna modules;

e) wherein the one of the plurality of antenna modules that is grounded through the ground capacitor is not connected to any of the plurality of feed-in modules;

f) wherein the plurality of antenna modules each comprise a rectangular shape, and wherein a total length of the plurality of antenna modules is equivalent to one-eighth to one wavelength of any one of the radio frequency signals; and g) wherein a first of the plurality of feed-in modules and a second of the plurality of antenna modules are connected at a first feed-in point, and a second of the plurality of feed-in modules and the second antenna module are connected at a second feed-in point, and wherein another sensing module of the at least one sensing module is a self-capacitive sensing module and connected with the second antenna module at a center position between the first feed-in point and the second feed-in point.

10. The multi-feed antenna with the shared radiator of claim 9, wherein the plurality of antenna modules are coupled with each other through a distributed capacitor structure or a lumped capacitor structure.

11. The multi-feed antenna with the shared radiator of claim 9, wherein each of the plurality of feed-in modules further comprises a matching circuit and a capacitor.

12. The multi-feed antenna with the shared radiator of claim 9, further comprising an inductor, and the at least one sensing module is connected with one of the antenna modules through the inductor.

13. The multi-feed antenna with the shared radiator of claim 12, wherein the at least one sensing module is self-capacitive sensing module, wherein if the multi-feed antenna with the shared radiator comprises the plurality of self-capacitive sensing modules, the self-capacitive sensing modules are connected with different antenna modules respectively.

14. The multi-feed antenna with the shared radiator of claim 9, wherein the at least one sensing module is mutual-capacitive sensing module, wherein the multi-feed antenna with the shared radiator comprises the plurality of mutual-capacitive sensing modules, and the mutual-capacitive sensing modules are connected with different antenna modules respectively.

* * * * *